(12) United States Patent
Kulkarni et al.

(10) Patent No.: US 9,255,200 B2
(45) Date of Patent: Feb. 9, 2016

(54) HEAT RESISTANCE IN POLYCARBONATE COMPOSITIONS

(75) Inventors: Amit S. Kulkarni, Evansville, IN (US); Rama Konduri, Detroit, MI (US); Vikram K. Daga, Evansville, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 349 days.

(21) Appl. No.: 13/601,597

(22) Filed: Aug. 31, 2012

(65) Prior Publication Data

US 2014/0066556 A1 Mar. 6, 2014

(51) Int. Cl.
*C08L 69/00* (2006.01)
*C08K 5/523* (2006.01)
*C08L 25/12* (2006.01)
*C08L 27/18* (2006.01)
*C08K 5/00* (2006.01)
*C08L 55/02* (2006.01)

(52) U.S. Cl.
CPC ............... *C08L 69/00* (2013.01); *C08K 5/0066* (2013.01); *C08L 55/02* (2013.01); *C08L 2205/03* (2013.01)

(58) Field of Classification Search
CPC ......... C08L 69/00; C08L 25/12; C08L 27/18; C08K 13/02; C08K 5/523
USPC ........................... 524/128, 158, 508, 140, 606
See application file for complete search history.

(56) References Cited

U.S. PATENT DOCUMENTS

| 4,448,930 | A | * | 5/1984 | Krishnan et al. ................. 525/67 |
| 7,786,246 | B2 | | 8/2010 | Jansen et al. |
| 2002/0161078 | A1 | * | 10/2002 | Zobel et al. .................... 524/115 |
| 2006/0079615 | A1 | * | 4/2006 | DeRudder et al. ............. 524/128 |
| 2009/0088504 | A1 | * | 4/2009 | Chatterjee et al. ............. 524/158 |
| 2011/0060106 | A1 | * | 3/2011 | de Kraker et al. ............. 525/101 |
| 2012/0202034 | A1 | * | 8/2012 | Morizur et al. ............... 428/220 |

FOREIGN PATENT DOCUMENTS

WO WO-2011130881 A1 10/2011
WO WO2011130881 A1 * 10/2011

OTHER PUBLICATIONS

International Search Report and Written Opinion issued on Mar. 27, 2013 for International Patent Application No. PCT/US2012/067258, filed Nov. 30, 2012 [Applicant—Sabic Innovative Plastics IP B.V. // pp. 1-15].

* cited by examiner

*Primary Examiner* — James J Seidleck
*Assistant Examiner* — Deve E Valdez
(74) *Attorney, Agent, or Firm* — Baker Hostetler LLP

(57) ABSTRACT

Disclosed herein are methods and compositions of blended polycarbonate compositions with improved heat resistance. The resulting compositions, comprising a first polycarbonate polymer, a second polycarbonate polycarbonate, an impact modifier, optionally a flow promoter, and optionally a flame retardant, can be used in the manufacture of articles while still retaining the advantageous physical properties of blended polycarbonate compositions with improved heat resistance. This abstract is intended as a scanning tool for purposes of searching in the particular art and is not intended to be limiting of the present invention.

37 Claims, No Drawings

HEAT RESISTANCE IN POLYCARBONATE COMPOSITIONS

BACKGROUND OF THE INVENTION

The present invention relates to polycarbonate compositions having, among other characteristics, improved heat resistance, and specifically to polycarbonate compositions having increased heat deflection temperature, increased melt stability, better hydrostability, and improved flame retardance. Also included herein are methods for preparing and/or using the same, as well as articles formed from such polycarbonate compositions.

Polycarbonates (PC) are synthetic thermoplastic resins derived from bisphenols and phosgenes, or their derivatives. Polycarbonates are a useful class of polymers having many desired properties. They are highly regarded for optical clarity and enhanced impact strength and ductility at room temperature.

Impact modifiers are incorporated into polymeric resins to improve the impact strength of finished articles made from such resins. An exemplary impact modifier is acrylonitrile-butadiene-styrene (ABS). ABS polymers are synthetic thermoplastic resins made by polymerizing acrylonitrile with styrene in the presence of polybutadiene. The properties of ABS can be modified by varying the relative proportions of the basic components, the degree of grafting, the molecular weight, etc.

There remains a need in the art for polycarbonate compositions having improved heat resistance, while maintaining good impact properties, flame retardance, ductility, and melt stability.

SUMMARY OF THE INVENTION

In accordance with the purpose(s) of the present invention, as embodied and broadly described herein, this disclosure, in one aspect, relates to polycarbonate compositions with improved heat resistance. In various aspects, the disclosed polycarbonate compositions have increased heat deflection temperature, increased melt stability, and improved flame retardance. The disclosed polycarbonate compositions comprise a first polycarbonate polymers, a second polycarbonate polymer, an impact modifier, optionally a flow promoter, and optionally a flame retardant. The disclosed polycarbonate compositions optionally further comprise polymer additives including, but not limited to, a filler, a primary anti-oxidant, a secondary anti-oxidant, and/or a mold release agent.

In one aspect, the invention relates blended polycarbonate compositions with improved heat resistance comprising:
(a) from about 1 pph to about 90 pph of a first polycarbonate polymer;
(b) from greater than about 0 pph to about 90 pph of a second polycarbonate polymer, wherein the second polycarbonate polymer is a high heat polycarbonate polymer;
(c) from about 1 pph to about 25 pph of at least one impact modifier composition;
(d) from about 0 pph to about 25 pph of a flow promoter;
(e) from about 0 pph to about 25 pph of a flame retardant; and
(e) pph balance of a polymer composition additives.

In a further aspect, the composition exhibits heat resistance with at least about 10% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer.

In a further aspect, the second polycarbonate polymer is copolymer of bisphenol A and a second monomer selected from 4,4'-(1-phenylethylidene)bisphenol ("bisphenol AP") and 2-phenyl-3,3-bis(4-hydroxyphenyl)phthalimidine ("PP-PBP"). In a still further aspect, the flame retardant is bisphenyl A bis diphenyl phosphate ("BPADP"). In a still further aspect, the flame retardant is resorcinol diphenyl phosphate ("RDP"). In an even further aspect, described herein are articles made from the disclosed compositions.

In another aspect, the present disclosure provides methods of increasing the heat deflection temperature, melt stability, and flame retardance of a polycarbonate composition comprising substituting all or a portion of a polycarbonate with bisphenol AP.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a ketone" includes mixtures of two or more ketones.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

The terms "BisAP" or "bisphenol AP," which can be used interchangeably, as used herein refers to a compound having a structure represented by the formula:

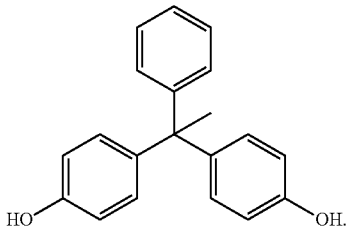

BisAP can also be referred to by the name 4,4'-(1-phenylethylidene)bisphenol; 1,1-bis(4-hydroxyphenyl)-1-phenylethane, and has the CAS #1571-75-1.

The term "PPPBP" as used herein refers to a compound having a structure represented by the formula:

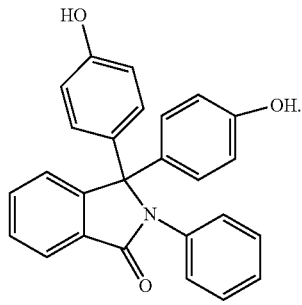 [SMILES: O=C1c2ccccc2C(c2ccc(O)cc2)(c2ccc(O)cc2)N1c1ccccc1]

PPPBP can also be referred to by the following names: 2-Phenyl-3,3-bis(4-hydroxyphenyl)phthalimidine; N-Phenyl-3,3-bis(4-hydroxyphenyl)phthalimidine; 3,3-bis(4-hydroxyphenyl)-2-phenylisoindolin-1-one; 3,3-bis(4-hydroxyphenyl)-2-phenyl-2,3-dihydro-1H-isoindol-1-one. PPPBP has the CAS #6607-41-6.

The terms "BisAP-PC" or "bisphenol AP-PC," which can be used interchangeably, as used herein refers to a polycarbonate copolymer comprising repeating carbonate units derived from BisAP and at least one other dihydroxy monomer such as a bisphenol. For example, BisAP-PC can be a polycarbonate copolymer comprising BisAP and bisphenol A monomer units.

The term "PPPBP-PC" refers to a polycarbonate copolymer comprising repeating carbonate units derived from PPPBP and at least one other dihydroxy monomer such as a bisphenol A. For example, PPPBP-PC can be a polycarbonate copolymer comprising PPPBP and bisphenol A monomer units.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Polycarbonate Compositions

As briefly described above, the present disclosure provides in one aspect BisAP-PC based extra high temperature polymer blends, such as, for example, a polycarbonate composition comprising an acrylonitrile-butadiene-styrene polymer (ABS) and bisphenol AP-PC. It is understood and herein contemplated that the disclosed polycarbonate compositions have improved heat deflection temperature, flame retardance, and melt stability, relative to blends that do not contain a BisAP-PC. Thus, in various aspects, the inventive polymer system exhibits at least one of improved heat deflection temperature, flame retardance, or melt stability. Additionally, the BisAP-PC containing blends disclosed herein can exhibit improved ductility and miscibility relative to blends that do not contain BisAP-PC.

Moreover, because the disclosed compositions show improved heat deflection temperature, flame retardance, melt stability, and color relative to blended polycarbonate compositions that do not contain the BisAP-PC, also disclosed herein are methods of increasing the heat deflection temperature, and flame retardance of a blended polycarbonate composition comprising a first polycarbonate polymer, an impact modifier, a flow promoter, and a flame retardant, comprising substituting all or a portion of the first polycarbonate polymer with BisAP-PC.

In one aspect, the invention relates blended polycarbonate compositions with improved heat resistance comprising:
(b) from about 1 pph to about 90 pph of a first polycarbonate polymer;
(b) from greater than about 0 pph to about 90 pph of a second polycarbonate polymer, wherein the second polycarbonate polymer is a high heat polycarbonate polymer;
(c) from about 1 pph to about 25 pph of at least one impact modifier composition;
(d) from about 0 pph to about 25 pph of a flow promoter;
(e) from about 0 pph to about 25 pph of a flame retardant; and
(e) pph balance of a polymer composition additives.

In a further aspect, the composition exhibits heat resistance with at least about 10% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer.

For example, disclosed herein are blended polycarbonate compositions comprising 24.6% wt ABS, 24.6% wt SAN, and 50% wt BisAP-PC. Also disclosed are blended polycarbonate compositions comprising 14.6% wt ABS, 14.6% wt SAN, and 70% wt BisAP-PC. Also disclosed are blended polycarbonate compositions comprising 4.6% wt ABS, 4.6% wt SAN, and 90% wt BisAP-PC.

For example, disclosed here are blended polycarbonate compositions comprising 24.6% wt ABS, 24.6% wt SAN, 25% wt bisphenol A polycarbonate, and 25% wt BisAP-PC. Also disclosed are blended polycarbonate compositions comprising 14.6% wt ABS, 14.6% wt SAN, 35% wt bisphenol A polycarbonate, and 35% wt BisAP-PC. Also disclosed are blended polycarbonate compositions comprising 4.6% wt ABS, 4.6% wt SAN, 45% wt bisphenol A polycarbonate, and 45% wt BisAP-PC.

For example, disclosed herein are blended polycarbonate compositions comprising 10% wt ABS, 0.65% wt a T-SAN (Teflon (PTFE)-Styrene-Acrylonitrile) resin, and 80% wt BisAP-PC. Also disclosed are blended polycarbonate compositions comprising 10% wt ABS, 0.65% wt a T-SAN (Teflon (PTFE)-Styrene-Acrylonitrile) resin, and 83% wt BisAP-PC. Also disclosed are blended polycarbonate compositions comprising 10% wt ABS, 0.65% wt a T-SAN (Teflon (PTFE)-Styrene-Acrylonitrile) resin, and 86% wt BisAP-PC.

For example, disclosed here are blended polycarbonate compositions comprising 10% wt ABS, 0.65% wt a T-SAN (Teflon (PTFE)-Styrene-Acrylonitrile) resin, 40% wt bisphenol A polycarbonate, and 40% wt BisAP-PC. Also disclosed are blended polycarbonate compositions comprising 10% wt ABS, 0.65% wt a T-SAN (Teflon (PTFE)-Styrene-Acrylonitrile) resin, 41.5% wt bisphenol A polycarbonate, and 41.5% wt BisAP-PC. Also disclosed are blended polycarbonate compositions comprising 10% wt ABS, 0.65% wt a T-SAN (Teflon (PTFE)-Styrene-Acrylonitrile) resin, 43% wt bisphenol A polycarbonate, and 43% wt BisAP-PC.

For example, disclosed herein are blended polycarbonate compositions comprising 10% wt ABS, 0.65% wt a T-SAN (Teflon (PTFE)-Styrene-Acrylonitrile) resin, and 80% wt PPPBP-PC. Also disclosed are blended polycarbonate compositions comprising 10% wt ABS, 0.65% wt a T-SAN (Teflon (PTFE)-Styrene-Acrylonitrile) resin, and 83% wt PPPBP-PC. Also disclosed are blended polycarbonate compositions comprising 10% wt ABS, 0.65% wt a T-SAN (Teflon (PTFE)-Styrene-Acrylonitrile) resin, and 86% wt PPPBP-PC.

For example, disclosed here are blended polycarbonate compositions comprising 10% wt ABS, 0.65% wt a T-SAN (Teflon (PTFE)-Styrene-Acrylonitrile) resin, 40% wt bisphenol A polycarbonate, and 40% wt PPPBP-PC. Also disclosed are blended polycarbonate compositions comprising 10% wt ABS, 0.65% wt a T-SAN (Teflon (PTFE)-Styrene-Acrylonitrile) resin, 41.5% wt bisphenol A polycarbonate, and 41.5% wt PPPBP-PC. Also disclosed are blended polycarbonate compositions comprising 10% wt ABS, 0.65% wt a T-SAN (Teflon (PTFE)-Styrene-Acrylonitrile) resin, 43% wt bisphenol A polycarbonate, and 43% wt PPPBP-PC.

In a further aspect, the first polycarbonate polymer is present in an amount from about 10 pph to about 75 pph. In a still further aspect, the first polycarbonate polymer is present in an amount from about 45 pph to about 95 pph. In a yet further aspect, the first polycarbonate polymer is selected from a bisphenol A polycarbonate, a brominated polycarbonate, a polyester carbonate copolymer, and a polycarbonate siloxane copolymer. In an even further aspect, the first polycarbonate polymer is a bisphenol A polycarbonate.

In a further aspect, the second polycarbonate polymer is present in an amount from about 35 pph to about 90 pph. In a still further aspect, the second polycarbonate polymer is present in an amount from about 40 pph to about 86 pph. In a yet further aspect, the second polycarbonate polymer is present in an amount from about 25 pph to about 45 pph. In an even further aspect, the second polycarbonate polymer is present in an amount from about 1 pph to about 25 pph.

In a still further aspect, the second polycarbonate polymer is a copolymer comprising bisphenol A and a second monomer selected from 4,4'-(1-phenylethylidene)bisphenol ("bisphenol AP") and 2-phenyl-3,3-bis(4-hydroxyphenyl) phthalimidine ("PPPBP"). In a yet further aspect, the second polycarbonate polymer is a copolymer comprising bisphenol A and bisphenol AP. In an even further aspect, the second polycarbonate polymer is a copolymer comprising bisphenol A and PPPBP.

In various aspects, blended polycarbonate composition further comprises a third polycarbonate copolymer. In a further aspect, the third polycarbonate copolymer is selected from a polycarbonate siloxane copolymer, a polyester carbonate copolymer, and a brominated polycarbonate. In a still further aspect, the third polycarbonate copolymer is a polycarbonate siloxane copolymer. In a yet further aspect, the third polycarbonate copolymer is a polyester carbonate copolymer. In an even further aspect, the third polycarbonate copolymer is a brominated polycarbonate.

In a further aspect, the impact modifier is a graft copolymer. In a still further aspect, the graft copolymer is selected from an acrylonitrile butadiene styrene ("ABS") polymer composition, a methyl methacrylate butadiene styrene ("MBS") polymer, or a mixture of these polymers. ABS and MBS polymers are synthetic thermoplastic resins made by polymerizing acrylonitrile or methacrylate, respectively, with styrene in the presence of polybutadiene. The properties of ABS; and MBS can be modified by varying the relative proportions of the basic components, the degree of grafting, the molecular weight, etc.

In a further aspect, the impact modifier is an acrylonitrile butadiene styrene ("ABS") polymer composition. In a still further aspect, the ABS polymer composition is an emulsion polymerized ABS. In a yet further aspect, the ABS polymer composition is a bulk polymerized ABS. In an even further aspect, the ABS polymer composition is a SAN grafted emulsion ABS. In a still further aspect, the butadiene content of the ABS polymer is from about 20% to about 75%. In a yet further aspect, the butadiene content of the ABS polymer is from about 30% to about 65%. In an even further aspect, the butadiene content of the ABS polymer is from about 40% to about 55%. In a still further aspect, the butadiene content of the ABS polymer is from about 10% to about 25%. In a yet further aspect, the acrylonitrile content of the ABS polymer is from about 5% to about 25%. In an even further aspect, the acrylonitrile content of the ABS polymer is from about 7% to about 17%.

In a further aspect, the impact modifier is a methyl methacrylate butadiene styrene ("MBS") polymer composition. In a still further aspect, the MBS polymer composition is present in an amount from about 1 pph to about 20 pph, from about 1 pph to about 10 pph, and from about 3 pph to about 7 pph. In a yet further aspect, the MBS polymer composition is present in an amount from about 1 pph to about 20 pph. In an even further aspect, the MBS polymer composition is present in an amount from about 1 pph to about 10 pph. In a still further aspect, the MBS polymer composition is present in an amount from about 3 pph to about 7 pph. In a yet further aspect, the MBS polymer composition is present in an amount of about 1 pph, about 2 pph, about 3 pph, about 4 pph, about 5 pph, about 6 pph, about 7 pph, about 8 pph, about 9 pph, about 10 pph, about 11 pph, about 12 pph, about 13 pph, about 14 pph, about 15 pph, about 16 pph, about 17 pph, about 18 pph, about 19 pph, or about 20 pph. In an even further aspect, the butadiene content of the MBS polymer is from about 70% wt to about 85% wt. In a still further aspect, the butadiene content of the MBS polymer is about 70% wt, about 71% wt, about 72% wt, about 73% wt, about 74% wt, about 75% wt, about 76% wt, about 77% wt, about 78% wt, about 79% wt, about 80% wt, about 81% wt, about 82% wt, about 83% wt, about 84% wt, or about 85% wt.

In a further aspect, the flow promoter is present in an amount from about 4 pph to about 14 pph. In a still further aspect, the flow promoter is a SAN copolymer. In a yet further aspect, the flow promoter is a SAN copolymer further comprising a polytetrafluoroethylene. In an even further aspect, the flow promoter is selected from a SAN copolymer, a polymethyl methacrylate ("PMMA"), and a polystyrene ("PS").

In a further aspect, the flame retardant is selected from oligomeric phosphate, polymeric phosphate, oligomeric phosphonate, or mixed phosphate/phosphonate ester flame retardant compositions. In a still further aspect, the flame retardant is selected from triphenyl phosphate; cresyldiphenylphosphate; tri(isopropylphenyl)phosphate; resorcinol bis (diphenylphosphate); and bisphenol-A bis(diphenyl phosphate). In a yet further aspect, the flame retardant is bisphenol-A bis(diphenyl phosphate) ("BPADP").

In a further aspect, the flame retardant is present in an amount from about 7 pph to about 20 pph. In a still further aspect, the flame retardant is present in an amount from about 4 pph to about 14 pph. In a yet further aspect, the flame retardant is present in an amount from about 4 pph to about 10 pph.

In a further aspect, the blended polycarbonate composition further comprises an anti-drip agent. In a still further aspect, the anti-drip agent is a T-SAN (Teflon (PTFE)-Styrene-Acrylonitrile) resin. In a yet further aspect, the T-SAN resin is present in amount from about 0 pph to about 2.00 pph. In an even further aspect, the T-SAN resin is present in an amount from about 0.10 pph to about 0.90 pph. In a still further aspect, the T-SAN resin is present in an amount from about 0.50 pph to about 0.70 pph. In a yet further aspect, the T-SAN resin is present in an amount of about 0.60 pph. In an even further aspect, the T-SAN resin is present in an amount of about 0.65 pph. In a still further aspect, the T-SAN resin is present in an amount of about 0.70 pph. In a yet further aspect, the T-SAN resin is present in an amount of about 0.45 pph, about 0.50 pph, about 0.55 pph, about 0.60 pph, about 0.65 pph, about 0.70 pph, or about 0.75 pph.

In a further aspect, the blended polycarbonate composition further comprises a filler. In a still further aspect, wherein the filler is present in an amount from greater than about 0 pph to about 25 pph. In a yet further aspect, the filler is selected from talc, silica, glass fibers, wollastonite, mica, clay, and titanium dioxide.

In a further aspect, the polymer composition additive comprises one or more of a colorant, anti-oxidant, mold release agent, lubricant, flame retardant agent, smoke suppressor agent, or anti-drip agent. In a still further aspect, the mold release agent is selected from methyl stearate; stearyl stearate, and pentaerythritol tetrastearate. In a yet further aspect, the mold release agent is pentaerythritol tetrastearate.

In a further aspect, the blended polycarbonate composition further comprises a primary antioxidant in an amount from about 0.001 pph to about 0.500 pph. In a still further aspect, the primary antioxidant is selected from hindered phenols, phosphites, phosphonates, and any mixture thereof. In a yet further aspect, the primary antioxidant is a hindered phenol.

In a further aspect, the blended polycarbonate composition further comprises a secondary antioxidant in an amount from about 0.001 pph to about 0.500 pph. In a still further aspect, the secondary antioxidant is a thioester or thioether. In a yet further aspect, the secondary antioxidant is selected from pentaerythritol tetrakis (3-(dodecylthio)propionate), pentaerythritol tetrakis[3-(3,5-di-tert-butyl-4-hydroxyphenyl) propionate], dilauryl thiodipropionate, distearyl thiodipropionate, dimyristyl thiodipropionate, ditridecyl thiodipropionate, pentaerythritol octylthiopropionate, and dioctadecyl disulphide. In an even further aspect, the secondary antioxidant is pentaerythritol tetrakis (3-(dodecylthio) propionate).

In various aspects, the invention relates to blended polycarbonate compositions with improved heat resistance comprising:
 (a) from about 35 pph to about 90 pph of a first polycarbonate polymer;
 (b) from about 10 pph to about 70 pph of a second polycarbonate polymer, wherein the second polycarbonate polymer is a high heat polycarbonate polymer;
 (c) from about 1 pph to about 25 pph of at least one impact modifier composition;
 (d) from about 0 pph to about 25 pph of a SAN copolymer;
 (e) from about 0 pph to about 25 pph of a flame retardant; and
 (f) pph balance of a polymer composition additives.

In various aspects, the invention relates to blended polycarbonate compositions with improved heat resistance comprising:
 (a) from about 25 pph to about 45 pph of a first polycarbonate polymer;
 (b) from about 25 pph to about 45 pph of a second polycarbonate polymer, wherein the second polycarbonate polymer is a high heat polycarbonate polymer;
 (c) from about 1 pph to about 25 pph of at least one impact modifier composition;
 (d) from about 0 pph to about 25 pph of a SAN copolymer;
 (e) from about 0 pph to about 25 pph of a flame retardant; and
 (f) pph balance of a polymer composition additives.

In various aspects, the invention relates to blended polycarbonate compositions with improved heat resistance comprising:
 (a) from about 1 pph to about 90 pph of a first polycarbonate polymer;
 (b) from greater than about 0 pph to about 90 pph of a second polycarbonate polymer, wherein the second polycarbonate polymer is a high heat polycarbonate polymer;
 (c) from about 1 pph to about 25 pph of at least one impact modifier composition;
 (d) from about 0 pph to about 25 pph of a SAN copolymer;
 (e) from about 0 pph to about 25 pph of a flame retardant; and
 (f) pph balance of a polymer composition additives.
wherein the composition exhibits heat deflection temperature with at least about 10% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer. In a further aspect, the composition exhibits heat deflection temperature with at least about 11%, 12%, 13%, 14%, 15%, 16%, 17%, 18%, 19%, or 20% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer.

In various aspects, the invention relates to blended polycarbonate compositions with improved heat resistance comprising:
- (a) from about 35 pph to about 90 pph of a first polycarbonate polymer;
- (b) from about 10 pph to about 70 pph of a second polycarbonate polymer, wherein the second polycarbonate polymer is a high heat polycarbonate polymer;
- (c) from about 1 pph to about 25 pph of at least one impact modifier composition;
- (d) from about 0 pph to about 25 pph of a SAN copolymer;
- (e) from about 0 pph to about 25 pph of a flame retardant; and
- (f) pph balance of a polymer composition additives;

wherein the composition exhibits heat deflection temperature with at least about 10% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer. In a further aspect, the composition exhibits heat deflection temperature with at least about 11%, 12%, 13%, 14%, 15%, 16%, 17%, 18%, 19%, or 20% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer.

In various aspects, the invention relates to blended polycarbonate compositions with improved heat resistance comprising:
- (a) from about 25 pph to about 45 pph of a first polycarbonate polymer;
- (b) from about 25 pph to about 45 pph of a second polycarbonate polymer, wherein the second polycarbonate polymer is a high heat polycarbonate polymer;
- (c) from about 1 pph to about 25 pph of at least one impact modifier composition;
- (d) from about 0 pph to about 25 pph of a SAN copolymer;
- (e) from about 0 pph to about 25 pph of a flame retardant; and
- (f) pph balance of a polymer composition additives;

wherein the composition exhibits heat deflection temperature with at least about 10% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer. In a further aspect, the composition exhibits heat deflection temperature with at least about 11%, 12%, 13%, 14%, 15%, 16%, 17%, 18%, 19%, or 20% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer.

In one aspect, the blended polymer compositions disclosed herein possess increased heat deflection temperature, and flame retardance relative to polymer blends without the without the bisphenol AP-PC and/or PPPBP-PC. For example, a similarly prepared blended polymer composition with a BisAP-PC has an increased heat deflection temperature of about 26° C. higher when compared to a similar blended polycarbonate composition that does not have a BisAP-PC. In one aspect, disclosed herein are blended polycarbonate compositions having an increased heat deflection temperature relative to a blended polycarbonate compositions without a BisAP-PC. In a further aspect, disclosed are blended polycarbonate compositions comprising BisAP-PC having a heat deflection temperature of at least about 101, 102, 103, 104, 108, 109, 110, 111, 112, 113, 114, 115, 116, 117, 118, 119, 120, 121, 122, 123, 124, 125, 126, 127, 128, 129, 130, 131, 132, 133, or 134° C.

In various aspects, described herein are articles made from the disclosed compositions. In one aspect, the invention relates to articles comprising a disclosed composition. In a further aspect, the article is used in automotive applications. In a still further aspect, the article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a further aspect, the article is used in applications pertaining to business equipment and computer housings. In a still further aspect the article is selected from printer housings, scanner housings and laptop housings.

Polycarbonate Polymer

As used herein, the term "polycarbonate" includes homopolycarbonates and copolycarbonates have repeating structural carbonate units. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In various aspects, the second polycarbonate can comprise copolymers comprising two or more distinct carbonate units. For example, a polycarbonate copolymer can comprise repeating carbonate units derived from BisAP and a second, chemically distinct dihydroxy monomer such as a bisphenol, e.g. bisphenol A. Alternatively, a polycarbonate copolymer can comprise repeating carbonate units derived from PPPBP and a second, chemically distinct dihydroxy monomer such as a bisphenol, e.g. bisphenol A.

In one aspect, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the polycarbonate.

In yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4-(4'-(1,1-bis(p-hydroxyphenyl)-ethyl)alpha,alpha-dimethylbenzyl)phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters).

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, from about 8 to about 10.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O^{2-}$), thiolate ($HS^-$), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediaminetetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including an polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be selfcleaning and should minimize any "hot spots." However, vented extruders similar to those that are commercially available can be used.

In addition to the polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

In other aspects, a polycarbonate composition can comprise one or more of an antioxidant, for instance, phosphorous containing stabilizers and hindered phenols, flame retardant, heat stabilizer, light stabilizer, UV absorbing additive, plasticizer, lubricant, mold release agent, antistatic agent, colorant (e.g., pigment and/or dye), or a combination thereof.

The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Thermoplastic compositions comprising blended polycarbonate compositions can be manufactured by various methods. For example, powdered polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Impact Modifier

In one aspect, the disclosed blended polycarbonate compositions with improved heat resistance and/or improved flame retardance of the present invention comprise one or more impact modifying agents, or impact modifiers. In one aspect, suitable impact modifiers are can be high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. In another aspect, a combination of any two or more individual impact modifiers can be used. In a yet further aspect, the impact modifier is emulsion polymerized. In a yet further aspect, the impact modifier in bulk polymerized.

An exemplary type of impact modifier is an elastomer-modified graft copolymer comprising an elastomeric (i.e., rubbery) polymer substrate having a $T_g$ less than about 10° C., less than about −10° C., or about −40° C. to −80° C., and a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically poly methyl methacrylate (PMMA) and polystyrene acrylonitrile (SAN).

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and methyl methacrylate-butadiene (MB).

In one aspect, the inventive polycarbonate composition comprises a styrene-ethylene-butadiene-styrene (SEBS) elastomer. In one aspect, a SEBS impact modifier comprises about 13 wt. % styrene, such as, for example, KRATON® G 1657M, available from Kraton Polymers. In another aspect, a SEBS impact modifier comprises about 33 wt. % styrene, such as, for example, KRATON® G 1651H, available from Kraton Polymers. In yet another aspect, a SEBS impact modifier comprises about 67 wt. % styrene, such as, for example, TUFTEC® H1043, available from Asahi Kasei Chemicals Corporation. In other aspects, other SEBS impact modifiers comprising various amounts of styrene can be used. Such impact modifiers are commercially available, and one of skill in the art, in possession of this disclosure, could readily select an appropriate SEBS impact modifier.

In one aspect, an inventive polycarbonate composition can comprise from about 1 wt. % to 30 wt %, for example, about 1, 2, 4, 6, 8, 10, 12, 14, 16, 18, 20, 22, 24, 26, 28, or 30 wt. %, of an impact modifier, based on the total weight of the polycarbonate, and any additional polymer including impact modifier, in the composition. In another aspect, a polycarbonate composition can comprise from about 1 wt. % to about 25 wt. %, for example, about 1, 3, 5, 7, 9, 11, 13, 15, 17, 19, 21, 23, or 25 wt. %, for example, about 21 wt. % of an impact modifier. In other aspects, the a specific amount of any one or more impact modifiers can vary, based on the remaining components in the system and desired properties of the resulting polymer.

In one aspect, when an impact modifier is blended with a polycarbonate blend, the notched Izod impact ("NII") strength can be improved as compared to conventional a polycarbonate blend not containing an impact modifier.

In a further aspect, the disclosed polycarbonate compositions disclosed herein further comprise an impact modifier, such as, for example, an MBS or ABS rubber.

Flame Retardant Additive

The inventive composition comprises a flame retardant additive. In various aspects, the flame retardant additive can comprise any flame retardant material or mixture of flame retardant materials suitable for use in the inventive composition. In one aspect, the flame retardant additive comprises bisphenol A diphenyl phosphate (BPADP). In another aspect, the flame retardant additive comprises a phosphate containing material. In another aspect, the flame retardant additive comprises a halogen containing material. In other aspects, the flame retardant additive is free of or substantially free of one or more of phosphate and/or a halogen.

The concentration of a flame retardant additive can vary, and the present invention is not intended to be limited to any particular flame retardant concentration. In one aspect, the inventive composition comprises from about 5 wt. % to about 20 wt. % of flame retardant additive, for example, about 5, 6, 7, 8, 9, 10, 11, 12, 13, 14, 15, 16, 17, 18, 19, or 20 wt. %. In other aspects, the inventive composition comprises from about 4 wt. % to about 15 wt. % of flame retardant additive, for example, about 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 wt. %. In one aspect, the composition comprises about 4 wt. % flame retardant additive, such as, BPADP. In another aspect, the composition comprises about 7 wt. % flame retardant additive, such as, BPADP. In still another aspect, the composition comprises about 10 wt. % flame retardant additive, such as, BPADP. Flame retardant additives are commercially available, and one of skill in the art could readily select an appropriate flame retardant additive.

Thus, specifically disclosed herein are polymer compositions comprising 10% wt ABS, 0.65% wt SAN, 10% wt BPADP, 40% wt polycarbonate, and 40% wt of a polymer selected from bisphenol AP-PC and PPPBP-PC. Also disclosed are polymer compositions comprising 10% wt ABS, 0.65% wt SAN, 7% wt BPADP, 41.5% wt polycarbonate, and 41.5% wt of a polymer selected from bisphenol AP-PC and PPPBP-PC. Also disclosed are PPPBP based XHT polymer compositions comprising 10% wt ABS, 0.65% wt SAN, 4% wt BPADP, 43% wt polycarbonate, and 43% wt of a polymer selected from bisphenol AP-PC and PPPBP-PC. Also disclosed are PPPBP based XHT polymer compositions comprising 10% wt ABS, 0.65% wt SAN, 4% wt BPADP, and 86% wt of a polymer selected from bisphenol AP-PC and PPPBP-PC. Also disclosed are PPPBP based XHT polymer compositions comprising 10% wt ABS, 0.65% wt SAN, 7% wt BPADP, and 83% wt of a polymer selected from bisphenol AP-PC and PPPBP-PC. Also disclosed are PPPBP based XHT polymer compositions comprising 10% wt ABS, 0.65% wt SAN, 10% wt BPADP, and 80% wt of a polymer selected from bisphenol AP-PC and PPPBP-PC.

Thus, specifically disclosed herein are polymer compositions comprising 10% wt ABS, 0.65% wt SAN, 10% wt BPADP, 40% wt polycarbonate, and 40% wt bisphenol AP-PC. Also disclosed are polymer compositions comprising 10% wt ABS, 0.65% wt SAN, 7% wt BPADP, 41.5% wt polycarbonate, and 41.5% wt bisphenol AP-PC. Also disclosed are PPPBP based XHT polymer compositions comprising 10% wt ABS, 0.65% wt SAN, 4% wt BPADP, 43% wt polycarbonate, and 43% wt bisphenol AP-PC. Also disclosed are PPPBP based XHT polymer compositions comprising 10% wt ABS, 0.65% wt SAN, 4% wt BPADP, and 86% wt bisphenol AP-PC. Also disclosed are PPPBP based XHT polymer compositions comprising 10% wt ABS, 0.65% wt SAN, 7% wt BPADP, and 83% wt bisphenol AP-PC. Also disclosed are PPPBP based XHT polymer compositions comprising 10% wt ABS, 0.65% wt SAN, 10% wt BPADP, and 80% wt bisphenol AP-PC.

Thus, specifically disclosed herein are polymer compositions comprising 10% wt ABS, 0.65% wt SAN, 10% wt BPADP, 40% wt polycarbonate, and 40% wt PPPBP-PC. Also disclosed are polymer compositions comprising 10% wt ABS, 0.65% wt SAN, 7% wt BPADP, 41.5% wt polycarbonate, and 41.5% wt PPPBP-PC. Also disclosed are PPPBP based XHT polymer compositions comprising 10% wt ABS, 0.65% wt SAN, 4% wt BPADP, 43% wt polycarbonate, and 43% wt PPPBP-PC. Also disclosed are PPPBP based XHT polymer compositions comprising 10% wt ABS, 0.65% wt SAN, 4% wt BPADP, and 86% wt PPPBP-PC. Also disclosed are PPPBP based XHT polymer compositions comprising 10% wt ABS, 0.65% wt SAN, 7% wt BPADP, and 83% wt PPPBP-PC. Also disclosed are PPPBP based XHT polymer compositions comprising 10% wt ABS, 0.65% wt SAN, 10% wt BPADP, and 80% wt PPPBP-PC.

In another aspect, the substitution of a polycarbonate for bisphenol AP-PC or PPPBP-PC in the disclosed polymer composition can cause a significant increase in flame retardance in addition to the increase in heat deflection temperature. In certain aspects, time to drip, as measured using the 5VTTD (5V-time-to-drip) test decreases with lower loadings of a plasticizing/flame retardant moiety such as bisphenyl A bis(diphenyl phosphate) (BPADP), such as a 4% loading of BPADP. A lower 5VTTD value is indicative of poorer flame retardance, hence expected to decrease with lower BPADP loadings. Thus, in one aspect, disclosed herein are polymer compositions comprising bisphenol AP-PC having increased flame retardance relative to polymer compositions without the bisphenol AP-PC, for example, a UL94 5VTTD of 67 seconds relative to 44 seconds for the corresponding composition without bisphenol AP. At higher BPADP loadings (i.e., greater than 5% such as, for example 7% or 10% loading of BPADP), flame out times ("FOT") decrease and flame ratings increase using UL94 UL V-FOT test and VXTOOL test, respectively. A lower flame out time and improved flame ratings are indicative of improved flame retardance. For example, disclosed herein are polymer compositions comprising 10% BPADP and bisphenol AP-PC having a V-FOT for 1.5 mm at 23° C. of 1 sec and VXTOOL p(FTP)V0 (i.e. probability of first time pass) of 1.0 when the similar polymer composition without bisphenol AP-PC has a V-FOT of 5 sec and VXTOOL p(FTP)V0 of 0.0. A p(FTP)V0 of 1.0 signifies a very high confidence/probability of attaining the V0 flame rating, whereas a p(FTP)V0 of 0.0 indicates a very poor probability of attaining the V0 flame rating. Also disclosed, for example, are polymer compositions comprising 7% BPADP and bisphenol AP-PC having a V-FOT for 1.5 mm at 23° C. of 2 sec and a VXTOOL p(FTP)V0 of at least 0.8 when the similar polymer composition without bisphenol AP-PC has a V-FOT of 7 sec and VXTOOL p(FTP)V0 of 0.0.

Other Additives for Blended Polycarbonate Compositions

In other aspects, the inventive polycarbonate can comprise one or more other materials that can maintain and/or improve various properties of the resulting material. In various aspects, the inventive polycarbonate can comprise an epoxy, an anti-drip agent, filler, or a combination thereof.

In addition to the isosorbide-based polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

In other aspects, a polycarbonate composition can comprise one or more of an antioxidant, flame retardant, heat stabilizer, light stabilizer, UV absorbing additive, plasticizer, lubricant, mold release agent, antistatic agent, colorant (e.g., pigment and/or dye), or a combination thereof.

In another aspect, the inventive polycarbonate composition can comprise a filler, such as, for example, an inorganic filler. The specific composition of a filler, if present, can vary, provided that the filler is chemically compatible with the remaining components of the polycarbonate composition. In one aspect, the polycarbonate composition comprises a filler, such as, for example, talc. If present, the amount of filler can comprise any amount suitable for a polycarbonate composition that does not adversely affect the desired properties thereof. In one aspect, the inventive polycarbonate comprises about 1 wt. % to about 10 wt. % of a filler.

In another aspect, a filler can comprise silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (atmospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

In one aspect, a filler, if present, can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Manufacture of Blended Polycarbonate Compositions

In various aspects, the blended polycarbonate compositions of the present invention can be manufactured by various methods. The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

The temperature of the melt is minimized in order to avoid excessive degradation of the resins. For example, it can be desirable to maintain the melt temperature between about 230° C. and about 350° C. in the molten resin composition, although higher temperatures can be used provided that the residence time of the resin in the processing equipment is kept short. In a still further aspect, the extruder is typically operated at a temperature of about 180° C. to about 385° C. In a yet further aspect, the extruder is typically operated at a temperature of about 200° C. to about 330° C. In an even further aspect, the extruder is typically operated at a temperature of about 220° C. to about 300° C.

In various aspects, the blended polycarbonate compositions of the present invention can be prepared by blending the first polycarbonate polymer, the second polycarbonate polymer, the impact modifier, the flow promoter, the flame retardant, and any polymer composition additive, e.g. a HENSCHEL-Mixer® high speed mixer or other suitable mixer/blender. Other low shear processes, including but not limited to hand mixing, can also accomplish this blending. The mixture can then be fed into the throat of a single or twin screw extruder via a hopper. Alternatively, at least one of the components can be incorporated into the composition by feeding directly into the extruder at the throat and/or downstream through a sidestuffer. Additives can also be compounded into a masterbatch desired polymeric resin and fed into the extruder. The extruder generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

Articles

In various aspects, the disclosed blended polycarbonate compositions with improved heat resistance of the present invention can be used in making articles. The disclosed blended polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming. The blended polycarbonate compositions described herein resins can also be made into film and sheet as well as components of laminate systems. In a further aspect, In an embodiment, a method of manufacturing an article comprises melt blending the hydrolytic stabilizer composition, the polycarbonate polymer composition, the impact modifier composition, and the SAN copolymer components; and molding the extruded composition into an article. In a still further aspect, the extruding is done with a single screw extruder or a twin screw extruder.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present invention pertains to articles comprising the disclosed blended polycarbonate compositions. In a further aspect, the article comprising the disclosed blended polycarbonate compositions is used in automotive applications. In a still further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

The materials shown in Table 1 were used to prepare the compositions described herein. Sample batches were prepared by pre-blending all constituents in a dry-blend and tumble mixing for 20 minutes. The pre-blend was fed directly to a co-rotating twin screw extruder (30 mm) operated under standard processing conditions well know to one skilled in the art.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Melt volume rate ("MVR") was determined per the test method of ASTM D1238 under the following test conditions: a) 260° C./2.16 kg; and b) 260° C./5 kg at a dwell time of 360 s and 1080 s (abusive condition). Data below are provided for MVR in cm$^3$/10 min.

Melt stability was assessed by observing a drop in viscosity as the sample was sheared at 260° C. for 1800 s. A "dynamic time sweep" was performed at a fixed strain amplitude of 15% for 1800 s at 10 rad/s to monitor changes in complex viscosity. The values reported in Table 3 are the drop in viscosity at the end of 1800 s.

Heat deflection temperature was determined per ISO 75 or ASTM D648 under a load of 1.8 MPa using a specimen of 4.0 mm or 3.2 mm thickness. Data below are provided in ° C.

The glass transition temperature ("Tg") was determined by differential scanning calorimetry ("DSC") run at a temperature ramp rate of 20° C./min in air. Data are provided below in ° C.

The notched Izod impact ("NII") test was carried out per ISO180/A or ASTM D256 at 23° C. using a specimen of 4 mm or 3.2 mm thickness. Both impact strength (kJ/m$^2$ or J/m) and ductility were determined.

Multiaxial impact was determined per ASTM D3763 at 23° C./3.5 m/s using a specimen of 3.2 mm thickness. The following parameters were determined: energy to maximum load (given in J); energy to failure (given in J); total energy (given in J); and ductility.

Flame properties were determined per the UL94 vertical bum test protocol. Samples were injection molded into 1.5 mm-thick flame bars (0.5" wide×5" long) using the compositions shown below. The injection molded flame bars were conditioned for 24 hours in a standard lab atmosphere (23° C., 50% relative humidity). Flame-out-times were recorded and analyzed.

TABLE 1

| Abbreviation | Description | Source |
|---|---|---|
| PC1 | BPA polycarbonate resin made by an interfacial process with a weight average molecular weight of about 30,000 on an absolute PC molecular weight scale | SABIC Innovative Plastics ("SABIC-IP") |
| PC2 | (BPA/BisAP copolycarbonate (89 mol % of BisAP) | SABIC-IP |
| PC3 | (PPPBP/BPA copolycarbonate (35 mol % PPPBP) | SABIC-IP |
| ABS1 | Emulsion polymerized acrylonitrile butadiene styrene with styrene acrylonitrile grafts on butadiene core, nominal butadiene content of 50.4 wt. % and acrylonitrile content of 11.1 wt. % | SABIC-IP |
| ABS2 | Bulk acrylonitrile butadiene styrene with nominal 16% butadiene content and nominal 15% acrylonitrile content, phase inverted with occluded SAN in a butadiene phase in SAN matrix | SABIC-IP |
| FR1 | Bisphenol A bis(diphenyl phosphate) | ICL Supresta, Inc. |
| ADD1 | Hindered phenol antioxidant | BASF Corp. |
| ADD2 | Pentaeryithritol tetrastearate | Lonza Inc. |
| ADD3 | SEENOX 412S pentaerythritol betalaurylthiopropionate | Rionlon Chemicals |
| ADD4 | Phosphite stabilizer | Chemtura Corp. |
| SAN1 | Styrene acrylonitrile copolymer comprising 15-25 wt. % acrylonitrile, bulk processed, with a nominal melt flow of 5.5 g/10 min at 230° C./1.2 KG. | SABIC-IP |
| SAN2 | Styrene acrylonitrile copolymer encapsulated PTFE | SABIC-IP |

Representative polycarbonate formulations with different levels of BisAP PC are shown in Table 2. Comparative examples A, B and C were formulated with PC homopolymer at 50, 70 and 90% loading respectively, and a balance of high rubber graft impact modifier with 50 parts of butadiene (ABS) and a flow promoter poly(styrene-co-acrylonitrile) copolymer (SAN). These formulations contain no BisAP-PC. Formulations 1 and 2; 3 and 4; and 5 and 6 are offsets to comparative examples A, B and C, respectively, wherein 50% of the PC phase and 100% of the PC phase is replaced with BisAP-PC copolymer (89 mole % Bis-AP comonomer).

TABLE 2

| # | Item | A | 1 | 2 | B | 3 | 4 | C | 5 | 6 |
|---|---|---|---|---|---|---|---|---|---|---|
| 1 | PC1 | 50 | 25 | 0 | 70 | 35 | 0 | 90 | 45 | 0 |
| 2 | PC2 | 0 | 25 | 50 | 0 | 35 | 70 | 0 | 45 | 90 |
| 3 | ABS1 | 24.6 | 24.6 | 24.6 | 14.6 | 14.6 | 14.6 | 4.6 | 4.6 | 4.6 |
| 4 | SAN1 | 24.6 | 24.6 | 24.6 | 14.6 | 14.6 | 14.6 | 4.6 | 4.6 | 4.6 |
| 5 | ADD1 | 0.3 | 0.3 | 0.3 | 0.3 | 0.3 | 0.3 | 0.3 | 0.3 | 0.3 |
| 6 | ADD2 | 0.15 | 0.15 | 0.15 | 0.15 | 0.15 | 0.15 | 0.15 | 0.15 | 0.15 |
| 7 | ADD3 | 0.2 | 0.2 | 0.2 | 0.2 | 0.2 | 0.2 | 0.2 | 0.2 | 0.2 |
| 8 | ADD4 | 0.1 | 0.1 | 0.1 | 0.1 | 0.1 | 0.1 | 0.1 | 0.1 | 0.1 |
|  | TOTAL | 99.95 | 99.95 | 99.95 | 99.95 | 99.95 | 99.95 | 99.95 | 99.95 | 99.95 |

Flow and physical property comparisons between these different formulations are documented in Table 3. As can be seen in these three sets of samples, incorporation of Bis-AP-PC results in a significant increase in the heat deflection temperature, measured in accordance of ISO75 protocol where the maximum observed delta (Δ) between a comparative example and a Bis-AP-PC containing offset is 26° C. (set 3, with comparative example C). The melt stability as measured by change in the melt viscosity at 260° C. over 1800 seconds also shows same order of performance for most of the BisAP-PC containing polycarbonate formulations. Examples 1, 3 and 5 where 50% of the PC phase in respective comparative examples were replaced with the BisAP-PC, also exhibit good Izod impact performance with 100% ductility at room temperature.

The incorporation of BisAP PC in the polycarbonate formulations in conjunction with PC homopolymer results in a completely miscible PC phase as indicated by a single narrow PC phase $T_g$'s which may have been shifted significantly based on the BisAP-PC content in the blend, compared to the PC homopolymer $T_g$ values of around 145° C.

Table 4 shows a series of flame retardant PC/ABS formulations with different levels of BisAP-PC copolymer at different loadings of the flame retardant, BPADP. Sample D contains no BisAP-PC and 10% BPADP. In comparative samples E and F the BPADP loading was decreased to 7% and 4% BPADP and these decreases were compensated by addition of higher PC amounts. Formulations, 7 & 8, 9 & 10, 11 & 12 are offsets to comparative examples D, E and F respectively, where 50% of the PC phase and 100% of the PC phase is replaced with BisAP-PC copolymer. It is contended that the aromatic nature of BisAP PC along with its high $T_g$ results in an improved flame performance as well as flame retardant PC-ABS blends with higher HDT. Very surprisingly, it was found that the properties are highly dependent upon the BPADP loading and occasionally completely opposite trends can be observed at high and low BPADP loadings.

TABLE 3

| No. | Test | Description | Unit | Condition | A | 1 | 2 | B | 3 | 4 | C | 5 | 6 |
|---|---|---|---|---|---|---|---|---|---|---|---|---|---|
| 1 | MVR | ASTM D1238 | cm³/10 min | 260° C./5 kg | 9.6 | 8.4 | 8.1 | 11.4 | 10.0 | 6.8 | 8.8 | 6.6 | 3.5 |
| 2 | Melt Stability | | % | 260° C. | −6 | −7 | −6 | −4 | −9 | −10 | −5 | −6 | −7 |
| 3 | HDT | ISO75 | ° C. | 1.8 MPa | 96.2 | 101 | 103 | 112 | 121 | 132 | 121 | 134 | 147 |
|  |  |  | Δ |  |  | 5 | 6 |  | 9 | 21 |  | 13 | 26 |
| 4 | DSC | Tg | ° C. | Air | 143 | 153 | 168 | 146 | 156 | 171 | 148 | 155 | 175 |
|  |  |  | Δ |  |  | 11 | 25 |  | 10 | 25 |  | 8 | 27 |
| 5 | Notched Izod | ISO180 | kJ/m² Ductility | 23° C./5.5 J | 92 100 | 75 100 | 11 100 | 105 100 | 62 100 | 12 100 | 68 100 | 47 100 | 18 0 |
| 6 | Tensile | ISO 527 |  |  |  |  |  |  |  |  |  |  |  |
|  | Chord Modulus-Avg |  | MPa | 50 mm/min | 2095 | 2198 | 2272 | 2124 | 2311 | 2455 | 2295 | 2414 | 2613 |
|  | Stress@Yield-Avg |  | MPa |  | 51 | 51 | 52 | 56 | 59 | 62 | 59 | 63 | 69 |
|  | Stress@Break-Avg |  | MPa |  | 51 | 47 | 43 | 61 | 59 | 51 | 57 | 52 | 56 |
|  | Strain@Yield-Avg |  | % |  | 4 | 4 | 4 | 5 | 5 | 5 | 6 | 6 | 6 |
|  | Strain@Break-Avg |  | % |  | 130 | 122 | 54 | 136 | 109 | 61 | 100 | 80 | 57 |
|  | Nominal Strain@Break-Avg |  | % |  | 166 | 137 | 43 | 171 | 135 | 49 | 120 | 75 | 50 |

TABLE 4

| # | Item | D | 7 | 8 | E | 9 | 10 | F | 11 | 12 |
|---|---|---|---|---|---|---|---|---|---|---|
| 1 | PC1 | 80 | 40 | 0 | 83 | 41.5 | 0 | 86 | 43 | 0 |
| 2 | PC2 | 0 | 40 | 80 | 0 | 41.5 | 83 | 0 | 43 | 86 |
| 3 | ABS2 | 10 | 10 | 10 | 10 | 10 | 10 | 10 | 10 | 10 |
| 4 | SAN2 | 0.65 | 0.65 | 0.65 | 0.65 | 0.65 | 0.65 | 0.65 | 0.65 | 0.65 |
| 5 | FR1 | 10 | 10 | 10 | 7 | 7 | 7 | 4 | 4 | 4 |
| 6 | ADD1 | 0.3 | 0.3 | 0.3 | 0.3 | 0.3 | 0.3 | 0.3 | 0.3 | 0.3 |
| 7 | ADD2 | 0.2 | 0.2 | 0.2 | 0.2 | 0.2 | 0.2 | 0.2 | 0.2 | 0.2 |
| 8 | ADD3 | 0.2 | 0.2 | 0.2 | 0.2 | 0.2 | 0.2 | 0.2 | 0.2 | 0.2 |
| 9 | ADD4 | 0.1 | 0.1 | 0.1 | 0.1 | 0.1 | 0.1 | 0.1 | 0.1 | 0.1 |
|  | TOTAL | 101.45 | 101.45 | 101.45 | 101.45 | 101.45 | 101.45 | 101.45 | 101.45 | 101.45 |

Table 5 shows the properties of the flame retardant formulations described in Table 4. From the close match between the regular (360 s dwell) and abusive (1080 s dwell) MVR data, it is clear that these formulations have good thermal stability. The 5VTTD test deviates from the UL 5VB protocol, in that the 5VTTD test involves a continuous application of a flame to the test specimen to determine the time in seconds required for the specimen the exhibit a flaming drip. The FOT reported below is the average value of the first and second FOT's in the UL V-FOT. VXTOOL is a statistical analysis tool for determining the probability of passing the UL V-test. Briefly, it involves testing 20 flame bars, compared to the 5 bars that are tested in the UL V0/V1/V2 testing, and calculation of a probability of getting a V0 or a V1 rating.

and the time required for the specimen to exhibit flaming drips is noted. Greater values of 5VTTD correspond to statistically higher chances of passing the 5VB flammability test. The 5VTTD test results indicate three distinct compositional regimes with distinct effect of BisAP on flammability performance. At high BPADP loadings of 10% (examples D, 7, and 8) the time to drip decreases as the loading of BisAP PC is increased correspondingly representing deterioration in flame performance. However, an opposite trend is observed at a low BPADP loading of 4% (examples F and 12) where the 5VTTD increases from 44 s to 67 s at 23° C./48 hr conditioning (48 s to 61 s at 70° C./168 hr conditioning). These formulations are characterized by an intermediate transition regime of BPADP loading of 7% (examples E, 9, and 10) where the

TABLE 5

| No. | Test Description | Unit | Condition | D | 7 | 8 | E | 9 | 10 | F | 11 | 12 |
|---|---|---|---|---|---|---|---|---|---|---|---|---|
| 1 | MVR (ASTM D1238) | $cm^3$/10 min | 260° C./2.16 KG/ 360 s | 13 | 12 | 10 | 9 | 8 | 7 | 6 | 5 | 4 |
|   |   |   | 260° C./2.16 KG/ 1080 s | 13 | 13 | 11 | 9 | 8 | 6 | 6 | 5 | 4 |
| 2 | HDT (ASTM D648) | ° C. | 1.8 MPa | 90 | 98 | 111 | 98 | 108 | 121 | 108 | 118 | 130 |
|   |   | Δ |   |   | 7 | 20 |   | 10 | 23 |   | 10 | 22 |
| 3 | Tg (DSC) | ° C. | Air, 20° C./min | 109 | 124 | 136 | 123 | 130 | 141 | 130 | 141 | 141 |
|   |   | Δ |   |   | 14 | 27 |   | 7 | 19 |   | 11 | 10 |
| 4 | Notched Izod (ASTM D256) | J/m | 23° C./5 lbf/ft | 116 | 91 | 73 | 697 | 113 | 79 | 842 | 472 | 94 |
|   |   | Ductility |   | 0 | 0 | 0 | 100 | 0 | 0 | 100 | 100 | 0 |
| 5 | 5VTTD (UL 94) | Avg (s) | 2 mm/23° C./ | 65 | 51 | 48 | 54 | 47 | 58 | 44 | 50 | 67 |
|   |   | SD (s) | 48 h | 7 | 4 | 3 | 5 | 2 | 4 | 3 | 4 | 7 |
|   |   | Avg (s) | 2 mm/70° C./ | 74 | 49 | 51 | 54 | 50 | 54 | 48 | 49 | 61 |
|   |   | SD (s) | 168 h | 8 | 3 | 2 | 4 | 3 | 5 | 2 | 2 | 6 |
| 7 | UL V-FOT (UL 94) | Avg (s) | 1.5 mm/23° C./ | 5 | 1 | 1 | 7 | 2 | 2 | 10 | 17 | 11 |
|   |   | SD (s) | 48 h | 6 | 1 | 1 | 6 | 2 | 2 | 7 | 24 | 15 |
|   |   | Avg (s) | 1.5 mm/70° C./ | 2 | 2 | 2 | 7 | 4 | 4 | 22 | 14 | 11 |
|   |   | SD (s) | 168 h | 2 | 1 | 2 | 9 | 4 | 3 | 24 | 13 | 13 |
| 8 | VXTOOL (UL 94) | p(FTP) V0 | 1.5 mm/23° C./ 48 h | 0.0 | 1.0 | 1.0 | 0.0 | 0.9 | 0.8 | 0.0 | 0.0 | 0.0 |
|   |   | p(FTP) V1 |   | 0.9 | 1.0 | 1.0 | 0.7 | 1.0 | 1.0 | 0.6 | 0.2 | 0.5 |
|   |   | p(FTP) V0 | 1.5 mm/70° C./ 168 h | 1.0 | 1.0 | 1.0 | 0.0 | 0.2 | 0.4 | 0.0 | 0.0 | 0.0 |
|   |   | p(FTP) V1 |   | 1.0 | 1.0 | 1.0 | 0.6 | 1.0 | 1.0 | 0.1 | 0.2 | 0.4 |

The HDT data follows the same trend as the non-FR formulations described above. Surprisingly, even with 4 to 10% addition of a plasticizing moiety such as BPADP, the HDT increase (Δ) of 23° C. is observed (set 2, with comparative example E). More surprisingly, the observed delta (Δ) in the $T_g$ between comparative examples (D, E & F) and BisAP PC containing formulations, follows a distinct trend of a higher difference at higher BPADP loadings; while the maximum change in $T_g$ is 27° C. at 10% loading of BPADP (comparative example D and Formulation 8), it is about 10° C. at 4% loading of BPADP (comparative example F and Formulation 12). This is counterintuitive, as one would have expected a greater sensitivity and effect of a high heat co-polymer at lower loadings of a plasticizer such as BPADP. Examples 11 and 12 represent cases of flame retardant PC-ABS compositions with a HDT of 120-130° C., something very atypical for this class of engineering thermoplastics blend. In particular, the example 11 is interesting as it represents a case where 100% ductility (notched Izod impact test) can be achieved while maintaining an extremely high HDT.

The flammability performance tested under various UL94 protocols shows some interesting unexpected trends. The first measure of flammability tested was the 5VTTD (5V time to drip) test at 2.0 mm thickness. The 5VTTD test involves continuous application of a 5VB test flame to the specimen, time to drip is independent of the BisAP PC loading. These results highlight the interactive effect of BisAP PC and BPADP on the time to drip performance.

The average flame out times (FOT) measured in vertical test (UL V-FOT) for 1.5 mm thick flame bars at 10% and 7% BPADP loading after a conditioning at 23° C. for 48 hrs decreased as BisAP PC was added indicating the ability of BisAP PC to improve the flame retardant performance. After conditioning at 70° C. for 168 hrs the FOT values remained statistically unchanged as BisAP PC was added. Thus the flame performance either improved or remained unchanged when BisAP PC was added at 10% and 7% BPADP loading. At 4% BPADP however, no trends in the FOT values were drawn. Overall, the FOT values decreased with increasing BPADP loading as expected.

The probability of first time pass p(FTP) for V1 and V0 flame ratings of 1.5 mm flame bars at 10% and 7% BPADP loading showed considerable improvements with increasing BisAP PC loading. For instance, the p(FTP) value for V0 rating for example D is 0.0 while it is 1.0 for examples 7 and 8, thus indicative of robust improvement in the flame rating from no rating for Example D to a significant V0 rating for Examples 7 and 8. Similar significant improvements are noted in Table 5 for formulations containing 7% BPADP (examples E, 9, and 10). These results show that BisAP PC can improve the flame retardant performance in the intermediate and high loading range of BPADP. The p(FTP) values at a BPADP loading of 4% (examples F, 11 and 12) after a conditioning at 23° C. for 48 hrs did not show a similar improvement.

Table 6 shows a series of flame retardant PC/ABS formulations with different levels of PPPBP-PC copolymer at different loadings of the flame retardant, BPADP. Sample G contains no PPPBP-PC and 10% BPADP. In comparative samples H and I the BPADP loading was decreased to 7% and 4% BPADP, respectively, and these decreases were compensated by addition of higher PC1 amounts. Formulations 13 and 14; 15 and 16; and 17 and 18 are offsets to comparative examples G, H and I, respectively, wherein 50% of the PC1 phase and 100% of the PC1 phase was replaced with PPPBP-PC copolymer.

TABLE 6

| # | Item | G | 13 | 14 | H | 15 | 16 | I | 17 | 18 |
|---|------|------|------|------|------|------|------|------|------|------|
| 1 | PC1 | 80 | 40 | 0 | 83 | 41.5 | 0 | 86 | 43 | 0 |
| 2 | PC3 | 0 | 40 | 80 | 0 | 41.5 | 83 | 0 | 43 | 86 |
| 3 | ABS2 | 10 | 10 | 10 | 10 | 10 | 10 | 10 | 10 | 10 |
| 4 | SAN2 | 0.65 | 0.65 | 0.65 | 0.65 | 0.65 | 0.65 | 0.65 | 0.65 | 0.65 |
| 5 | FR1 | 10 | 10 | 10 | 7 | 7 | 7 | 4 | 4 | 4 |
| 6 | ADD1 | 0.3 | 0.3 | 0.3 | 0.3 | 0.3 | 0.3 | 0.3 | 0.3 | 0.3 |
| 7 | ADD2 | 0.2 | 0.2 | 0.2 | 0.2 | 0.2 | 0.2 | 0.2 | 0.2 | 0.2 |
| 8 | ADD3 | 0.2 | 0.2 | 0.2 | 0.2 | 0.2 | 0.2 | 0.2 | 0.2 | 0.2 |
| 9 | ADD4 | 0.1 | 0.1 | 0.1 | 0.1 | 0.1 | 0.1 | 0.1 | 0.1 | 0.1 |
| | TOTAL | 101.45 | 101.45 | 101.45 | 101.45 | 101.45 | 101.45 | 101.45 | 101.45 | 101.45 |

It was found that the HDT increased as the amount of PPPBP-PC was increased in the formulation (see Table 7). For example, comparison of samples 13 and 14 with sample G) shows an increase of 13.4° C. and 30.4° C. as the amount of PPPBP-PC is increased. Similar trends were observed for the other samples (e.g. compare samples 15 and 16 to sample H, or samples 17 and 18 to sample I). At the highest loading of BPADP, the incorporation of PPPBP-PC into the formulation had only a modest effect on the notched Izod impact strength.

TABLE 7

| No. | Test | Unit | Condition | G | 13 | 14 | H | 15 | 16 | I | 17 | 18 |
|---|---|---|---|---|---|---|---|---|---|---|---|---|
| 1 | MVR (ASTM D1238) | cm³/10 min | 260° C./2.16 kg/360 s | 12.2 | 18.6 | 16.2 | 9.29 | 8.74 | 7.74 | 5.79 | 4.91 | 4.27 |
| | | | 260° C./2.16 kg/1080 s | 16.4 | 32.8 | 45.8 | 9.81 | 7.32 | 16.3 | 6.24 | 5.52 | 4.28 |
| 2 | HDT (ASTM D648) | ° C. | 1.8 MPa | 88.7 | 102 | 120 | 99 | 113 | 131 | 106 | 121 | 142 |
| | | Δ | | | 13.3 | 30.4 | | 13.8 | 31.8 | | 15.3 | 36 |
| 3 | Tg (DSC) | ° C. | air, 20° C./min | 112 | 125 | 146 | 121 | 135 | 160 | 130 | 145 | 175 |
| | | Δ | | | 12.7 | 33.8 | | 13.9 | 38.9 | | 15.1 | 45 |
| 4 | Notched Izod (ASTM D256) | J/m | 23° C./5 lbf/ft | 109 | 108 | 55.2 | 749 | 120 | 75.1 | 955 | 156 | 80.3 |
| | | Ductility | | 0 | 0 | 0 | 100 | 0 | 0 | 100 | 0 | 0 |
| 5 | MAI (ASTM D3763) | Energy to max load (J) | 23° C./3.5 m/s/3.2 mm | 63.9 | 65.1 | 13.5 | 66.2 | 67.9 | 2.18 | 68.7 | 64.2 | 12.5 |
| | | Energy to failure (J) | | 72 | 71 | 14.3 | 76.1 | 71.4 | 2.6 | 75.2 | 68.7 | 13.5 |
| | | Total energy (J) | | 72 | 71 | 14.4 | 76.1 | 71.4 | 3.74 | 75.2 | 68.7 | 13.6 |
| | | Ductility | | 100 | 100 | 0 | 100 | 100 | 0 | 100 | 100 | 0 |
| 6 | TTD (UL 94 5V) | Avg (s) | 2 mm/23° C./48 h | 67.9 | 49.7 | 45.8 | 58.3 | 43.9 | 47.5 | 49.9 | 44.2 | 45.1 |
| | | SD (s) | | 7.8 | 6 | 2.3 | 9.1 | 4.3 | 3.7 | 4.5 | 5 | 4 |
| | | Avg (s) | 2 mm/70° C./168 h | 59.9 | 48.3 | 44.2 | 55.4 | 49.6 | 48.5 | 48.7 | 46.5 | 44.3 |
| | | SD (s) | | 5.9 | 3.1 | 4.1 | 5.7 | 3.2 | 5 | 5 | 3.1 | 3.8 |
| 7 | VXTOOL (UL 94) | p(FTP) V-0 | 1.5 mm/23° C./48 h | 1.0 | 0.74 | 1 | 0.1 | 0.52 | 0.93 | 0 | 0 | 0 |
| | | p(FTP) V-1 | | 1.0 | 1.0 | 1.0 | 0.91 | 1.0 | 1.0 | 0 | 0 | 0.76 |
| | | p(FTP) V-0 | 1.5 mm/70° C./168 h | 1.0 | 1.0 | 1.0 | 0.15 | 0.79 | 0.94 | 0 | 0 | 0 |

TABLE 7-continued

| No. | Test | Unit | Condition | G | 13 | 14 | H | 15 | 16 | I | 17 | 18 |
|---|---|---|---|---|---|---|---|---|---|---|---|---|
| | | p(FTP) V-1 | | 1.0 | 1.0 | 1.0 | 0.95 | 1.0 | 1.0 | 0.1 | 0.1 | 0.34 |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blended polycarbonate composition with improved heat resistance comprising:
   (a) from about 0 pph to about 90 pph of a first polycarbonate polymer;
   (b) from about 1 pph to about 90 pph of a second polycarbonate polymer, wherein the second polycarbonate polymer is a high heat polycarbonate polymer and is a copolymer of bisphenol A and 4,4'-(1-phenylethylidene) bisphenol;
   (c) from about 1 pph to about 25 pph of at least one impact modifier composition;
   (d) from about 0 pph to about 25 pph of a polystyrene acrylonitrile copolymer;
   (e) from about 0 pph to about 25 pph of a flame retardant; and
   (f) pph balance of one or more of a polymer composition additive.

2. The composition of claim 1, wherein the first polycarbonate polymer is present in an amount from about 45 pph to about 95 pph.

3. The composition of claim 1, wherein the first polycarbonate polymer is a bisphenol A polycarbonate.

4. The composition of claim 1, wherein the second polycarbonate polymer is present in an amount from about 35 pph to about 90 pph.

5. The composition of claim 1, further comprising a third polycarbonate polymer.

6. The composition of claim 5, wherein the third polycarbonate polymer is selected from a brominated polycarbonate, a polyester carbonate copolymer, and a polycarbonate siloxane copolymer.

7. The composition of claim 1, wherein the impact modifier is an acrylonitrile butadiene styrene polymer composition.

8. The composition of claim 7, wherein the butadiene content is from about 20% to about 75%.

9. The composition of claim 7, wherein the acrylonitrile content is from about 5% to about 25%.

10. The composition of claim 1, wherein the polystyrene acrylonitrile copolymer comprises from about 10 pph to about 40 pph.

11. The composition of claim 1, wherein the flame retardant is selected from oligomeric phosphate, polymeric phosphate, oligomeric phosphonate, or mixed phosphate/phosphonate ester flame retardant compositions.

12. The composition of claim 1, wherein the flame retardant is selected from triphenyl phosphate; cresyldiphenylphosphate; tri(isopropylphenyl)phosphate; resorcinol bis (diphenylphosphate); and bisphenol-A bis(diphenyl phosphate).

13. The composition of claim 1, wherein the flame retardant is bisphenol-A bis(diphenyl phosphate).

14. The composition of claim 1, wherein the flame retardant is present in an amount from about 7 pph to about 20 pph.

15. The composition of claim 1, wherein the composition further comprises an anti-drip agent.

16. The composition of claim 15, wherein the anti-drip agent is a polytetrafluoroethylene styrene acrylonitrile copolymer.

17. The composition of claim 15, wherein the anti-drip agent is present in an amount from about 4 pph to about 14 pph.

18. The composition of claim 1, wherein blended polycarbonate composition further comprises a filler.

19. The composition of claim 18, wherein the filler is present in an amount from greater than about 0 pph to about 25 pph.

20. The composition of claim 18, wherein the filler is selected from talc, silica, wollastonite, mica, clay, and titanium dioxide.

21. The composition of claim 1, wherein the polymer composition additive comprises one or more of a colorant, antioxidant, mold release agent, lubricant, flame retardant agent, smoke suppressor agent, or anti-drip agent.

22. The composition of claim 1, further comprising a primary antioxidant in an amount from about 0.001 pph to about 0.500 pph.

23. The composition of claim 22, wherein the primary antioxidant is selected from hindered phenols, phosphites, phosphonates, and any mixture thereof.

24. The composition of claim 1, further comprising a secondary antioxidant in an amount from about 0.001 pph to about 0.500 pph.

25. The composition of claim 24, wherein the secondary antioxidant is a thioester or thioether.

26. A blended polycarbonate composition with improved heat resistance comprising:
   (a) from about 1 pph to about 90 pph of a first polycarbonate polymer;
   (b) from greater than about 0 pph to about 90 pph of a second polycarbonate polymer, wherein the second polycarbonate polymer is a high heat polycarbonate polymer and is a copolymer of bisphenol A and 4,4'-(1-phenylethylidene)bisphenol;
   (c) from about 1 pph to about 25 pph of at least one impact modifier composition;
   (d) from about 0 pph to about 25 pph of a polystyrene acrylonitrile copolymer;
   (e) from about 0 pph to about 25 pph of a flame retardant; and
   (f) pph balance of one or more of a polymer composition additive, wherein the composition exhibits heat resistance with at least about 10% greater heat deflection temperature than that of a reference composition consisting essentially of substantially the same proportions of the first polycarbonate polymer; the impact modifier; the flow promoter; if present; the flame retardant, if present; and, in the absence of the same second polycarbonate polymer.

27. The composition of claim 26, wherein the flame retardant is bisphenol-A bis(diphenyl phosphate).

28. The composition of claim 26, wherein the flame retardant is present in an amount from about 7 pph to about 20 pph.

29. The composition of claim 26, wherein the flame retardant is present in an amount from about 4 pph to about 14 pph.

30. A blended polycarbonate composition with improved heat resistance comprising:
   (a) from about 35 pph to about 90 pph of a first polycarbonate polymer;
   (b) from about 10 pph to about 70 pph of a second polycarbonate polymer, wherein the second polycarbonate polymer is a high heat polycarbonate polymer and is a copolymer of bisphenol A and 4,4'-(1-phenylethylidene) bisphenol;
   (c) from about 1 pph to about 25 pph of at least one impact modifier composition;
   (d) from about 0 pph to about 25 pph of a polystyrene acrylonitrile copolymer;
   (e) from about 0 pph to about 25 pph of a flame retardant; and
   (f) pph balance of one or more of a polymer composition additive.

31. The composition of claim 30, wherein the flame retardant is bisphenol-A bis(diphenyl phosphate).

32. The composition of claim 30, wherein the flame retardant is present in an amount from about 7 pph to about 20 pph.

33. The composition of claim 30, wherein the flame retardant is present in an amount from about 4 pph to about 14 pph.

34. A blended polycarbonate composition with improved heat resistance comprising:
   (a) from about 25 pph to about 45 pph of a first polycarbonate polymer;
   (b) from about 25 pph to about 45 pph of a second polycarbonate polymer, wherein the second polycarbonate polymer is a high heat polycarbonate polymer and is a copolymer of bisphenol A and 4,4'-(1-phenylethylidene) bisphenol;
   (c) from about 1 pph to about 25 pph of at least one impact modifier composition;
   (d) from about 0 pph to about 25 pph of a polystyrene acrylonitrile copolymer;
   (e) from about 0 pph to about 25 pph of a flame retardant; and
   (f) pph balance of one or more of a polymer composition additive.

35. The composition of claim 34, wherein the flame retardant is bisphenol-A bis(diphenyl phosphate).

36. The composition of claim 34, wherein the flame retardant is present in an amount from about 7 pph to about 20 pph.

37. The composition of claim 34, wherein the flame retardant is present in an amount from about 4 pph to about 14 pph.

* * * * *